(12) United States Patent
Hinkel et al.

(10) Patent No.: US 7,832,478 B2
(45) Date of Patent: Nov. 16, 2010

(54) METHODS FOR MANIPULATION OF AIR FLOW INTO AQUIFERS

(75) Inventors: Jerald J. Hinkel, Houston, TX (US); Gregory Kubala, Houston, TX (US); Richard D. Hutchins, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 78 days.

(21) Appl. No.: 11/936,384

(22) Filed: Nov. 7, 2007

(65) Prior Publication Data

US 2009/0118144 A1    May 7, 2009

(51) Int. Cl.
*E21B 43/22* (2006.01)
*E21B 43/27* (2006.01)

(52) U.S. Cl. .................. 166/279; 166/300; 166/307; 166/308.1; 166/371

(58) Field of Classification Search .............. None
See application file for complete search history.

(56) References Cited

U.S. PATENT DOCUMENTS

| | | | |
|---|---|---|---|
| 3,497,011 A | 2/1970 | Weber et al. | |
| 3,724,551 A | 4/1973 | Troscinski | |
| 3,794,114 A * | 2/1974 | Brandon | 166/249 |
| 4,031,958 A | 6/1977 | Sandiford | |
| 4,476,931 A * | 10/1984 | Boles et al. | 166/294 |
| 4,485,875 A | 12/1984 | Falk | |
| 4,532,052 A | 7/1985 | Weaver | |
| 4,737,265 A | 4/1988 | Merchant | |
| 4,836,285 A | 6/1989 | Navratil | |
| 5,067,564 A | 11/1991 | Sydansk | |
| 5,289,888 A | 3/1994 | Talley | |
| 5,529,124 A | 6/1996 | Hwan | |
| 5,780,395 A * | 7/1998 | Sydansk | 507/202 |
| 6,569,983 B1 | 5/2003 | Treybig | |
| 6,695,055 B2 | 2/2004 | Hirasaki | |
| 7,281,579 B2 | 10/2007 | Thomas et al. | |
| 2005/0016733 A1 | 1/2005 | Dawson | |

FOREIGN PATENT DOCUMENTS

| | | |
|---|---|---|
| CA | 1277936 | 12/1990 |
| WO | 9812239 | 3/1998 |

OTHER PUBLICATIONS

Muskat, M. and Wyckoff, RD., "An Approximate Theory of Water-coning in Oil Production", Trans. AIME, vol. 114-163 (1935).
Johns. R.T. Lake, L. W., Delliste, A.M., "Prediction of Capillary Fluid Interfaces During Gas or Water Coning in Vertical Well", SPEJ, 440-448 (Dec. 2005).
Ansari, R.Z., Johns, R. T., "Steady-State Coning Solutions with Multiple Wells and Reservoir Boundaries", SPE 99896 (Apr. 2006).

* cited by examiner

*Primary Examiner*—Zakiya W. Bates
(74) *Attorney, Agent, or Firm*—David Cate; Robin Nava; Rachel Greene

(57) ABSTRACT

A method of treating a subterranean formation penetrated by a wellbore to mitigate the production of unwanted air from the wellbore is carried out by forming a treatment fluid containing a water-wetting surfactant and a carrier fluid. The treatment fluid is then introduced into the wellbore. The treatment or treatments may be performed remedially or prophylactically. The treatment may include the completion and production of zones containing the undesirable air and the deliberate formation of cones therein.

16 Claims, 2 Drawing Sheets

METHODS FOR MANIPULATION OF AIR FLOW INTO AQUIFERS

BACKGROUND

The statements in this section merely provide background information related to the present disclosure and may not constitute prior art.

Coning in aquifers is a common problem which includes, but is not limited to, air coning. Air coning in aquifers occurs when an aquifer supplying water to the surface via an artesian well, natural spring or pumped well, is in communication with air above. In those instances, air can cone downward into the aquifer and limit the amount of water being produced. Eventually, the air encroachment may be significant enough so that very little or no water is produced. Thus, air can cone downward and occlude the perforations decreasing and eventually preventing liquid production.

Some current methods which are useful to prevent or reduce unwanted air production include injecting a "blocking" or "plugging" agent that effectively blocks off or seals the desirable water zone. Various polymers and gels can been used for this purpose. Blocking agents may be injected into the formation in a non-swollen or a non-precipitated state. The blocking materials can swell or precipitate, thus plugging or blocking off the area from further air influx. The use of these materials may have some disadvantages, however. Such treatments may be rather costly and it is difficult to place the blocking materials to sufficiently seal off a large enough area. Furthermore, the blocking treatment may be ineffective when fissures or fractures are present in the aquifers. If clean-up of the materials is necessary, these materials may be difficult to remove. And in some cases, these materials may inadvertently result in permanent blocking or plugging of the desired production zone.

Because of the shortcomings of these various methods, new methods and improvements to control unwanted air flow into aquifers are needed.

SUMMARY OF THE INVENTION

This invention relates to a method of reducing the deleterious effects of air or vapor invasion into an aquifer in a subterranean formation by placing a water-wetting surfactant in the formation.

Disclosed are methods of treating a subterranean formation penetrated by a wellbore, the method serving to mitigate the production of undesirable air from a wellbore. In one aspect, the methods include producing the air from the zone predominantly containing the air so as to form a cone of water upward into the zone predominantly containing the air, forming a treatment fluid containing a carrier fluid and at least one of a water-wetting surfactant or a surfactant which strongly reduces the surface tension and introducing the treatment fluid into the wellbore, and subsequently producing from the zone predominantly containing the water.

The treatment fluid may be introduced into the zone predominantly containing the water prior to producing the air from the zone predominantly containing the air so as to form a cone from the zone predominantly containing the water into the zone predominantly containing the air. Also, the treatment fluid may be introduced into the zone predominantly containing the air prior to producing the air from the zone predominantly containing the air so as to form a cone from the zone predominantly containing the water into the zone predominantly containing the air.

Methods of the invention may use carrier fluid which is aqueous or non-aqueous, or even an emulsion.

In other embodiments of the invention, methods of treating a subterranean formation penetrated by a wellbore to mitigate the production of air from the wellbore are disclosed. Such methods include, prior to producing fluids from the wellbore, forming a treatment fluid containing at least one of a water-wetting surfactant or a surfactant which strongly reduces the surface tension and a carrier fluid, introducing the treatment fluid into the wellbore, and subsequently producing the well.

In another aspect, a method of treating a subterranean formation penetrated by a wellbore to mitigate the production of air from the wellbore, where a cone of the air exists in the zone predominantly containing the water is described. The method includes forming a treatment fluid containing at least one of a water-wetting surfactant or a surfactant which strongly reduces the surface tension and a carrier fluid, introducing the treatment fluid into the wellbore, and subsequently producing the well. In yet another aspect, the methods are treating a subterranean formation containing a fracture that extends toward an aqueous-bearing portion of the formation, where the method includes forming a treatment fluid containing at least one of a water-wetting surfactant or a surfactant which strongly reduces the surface tension and a carrier fluid, and introducing the treatment fluid into the fracture.

BRIEF DESCRIPTION OF THE DRAWINGS

For a more complete understanding of the present invention, and the advantages thereof, reference is now made to the following descriptions taken in conjunction with the accompanying figures, in which.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

Figure 1:
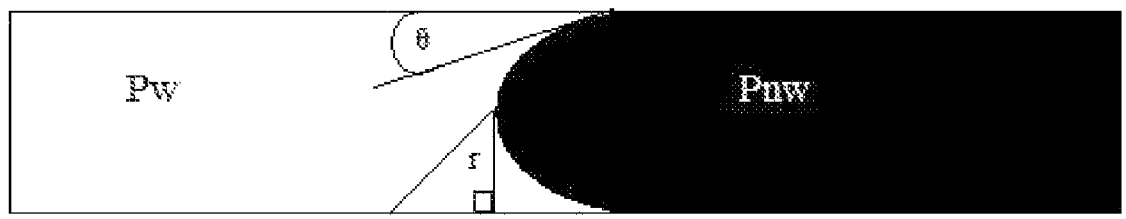
FIG. 1 is a schematic showing two interfacing immiscible fluids within a capillary tube.

This invention relates to a method of reducing the deleterious effects of air invasion into an aquifer in a subterranean formation by placing a water-wetting surfactant in the formation. Capillary pressure in subterranean formations may aid in the influx of undesirable air into an aquifer. It has been discovered that by changing the wettability of the formation within which the aquifer resides, to manipulate the capillary pressure, the movement of air can be reduced or eliminated. To illustrate the effect, FIG. 1 shows the interface of two immiscible fluids in a capillary tube. The capillary pressure is defined as the pressure difference between two interfacing immiscible fluids in static equilibrium and may be represented by the Equation (1) below:

$$P_c = P_{nw} - P_w \quad (1)$$

where,
$P_c$=the capillary pressure;
$P_{nw}$=the pressure of the non-wetting fluid; and
$P_w$=the pressure of the wetting fluid.

The capillary pressure is also related to the contact angle, θ, (FIG. 1) between the liquid interface and the capillary, which is given by the Young-Laplace equation represented by Equation (2) below:

$$P_c = 2\gamma \cdot \cos\theta / r \quad (2)$$

where,
γ=the interfacial tension between the wetting and non-wetting fluids;
θ=the contact angle; and
r=the effective radius of the capillary.

Accordingly, it is well established that by changing the contact angle, the capillary pressure can also be changed. It is also well established that the capillary pressure can be changed by manipulating interfacial tensions. The most common method for changing interfacial tension is by adding surfactants to one or both of the fluids.

The surfactant absorption is dependent upon the rock properties of the formation being treated and may vary according to the cation exchange capacity (CEC), the pH of the applied treatment, the rock type, the average surface area to volume ratio, the amount and type of clay minerals, the ionic makeup of the pore fluid and the ionic makeup of the treatment fluid.

Many surfactants will decrease the interfacial tension from about 10% to 65%, but will not alter the contact angle substantially. In contrast, those surfactants that can attain a neutral wettability, as evidenced by changing the contact angle to about 70° to 110°, will lower the capillary pressure by two mechanisms—interfacial tension and wettability.

Figure 2:
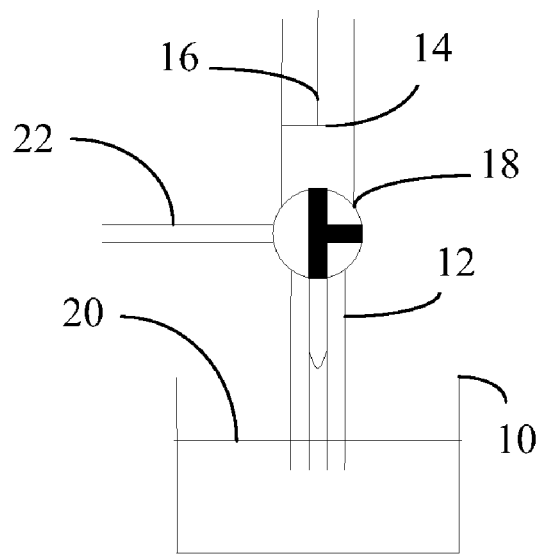
FIG. 2 is a schematic showing a capillary system for use in testing surfactants for use in treating a subterranean formation in accordance with the invention.

In order to determine the suitability of a surfactant in altering the surface of the formation pores and channels, a simple experiment can be conducted. A simple testing apparatus, such as that shown in FIG. 2, may be used for evaluating surfactants. The apparatus consists of a fluid container 10, which may be in the form of a beaker, bottle or test tube, a capillary tube 12, an upper fluid reservoir 14 with a plunger 16 and a three-way stopcock 18. This apparatus provides a simple model of a reservoir system. The three-way valve 18 provides a convenient method of controlling the fluid flow and column height, and also allows trapped air to be removed from the system. A cathetometer or other measuring device (not shown) may be used or provided with the apparatus to measure fluid height, etc.

The capillary tube 12 should have a diameter small enough to result in an appreciable rise in the wetting fluid 20. Capillary diameters of 0.5 to 1 mm have been found to be suitable. These sizes result in a water rise of about 2.3 in. (5.84 cm) and about 1.15 in (2.92 cm), respectively. The material of the capillary may be glass. This will provide a suitable simulation for formations composed of siliceous materials. Other materials of the capillary tube may also be used to simulate materials of the formation to be treated.

A side inlet 22 is provided to simulate the bottom of the wellbore or a perforated area and allows air to be bleed from the system, if necessary. The valve 18 allows the inlet 22 to be selectively opened or closed.

In carrying out tests using the apparatus, the capillary tube may be cleaned to remove contaminants or other residue. Soaking the capillary tubes in hot nitric acid for about 5 minutes has been found to be effective in cleaning the tube surfaces. The tubes are then dried. Other components, such as the container 10 for holding the test fluid, may be cleaned in a similar manner, as well.

A test using the desired surfactant-free fluid may initially be used for the capillary test to provide a baseline. The container 10 is filled with the fluid and the capillary 12 is lowered into the fluid 20, with the side inlet 22 open to the capillary tube 12 to bleed off air. The fluid should tend to rise within the capillary. Any air bubbles within the capillary should be removed by raising the capillary up and slowly lowering it into the solution 20. If this is unsuccessful in removing the air bubbles, the capillary should be washed again in hot nitric acid solution to clean the walls of the tube.

To ensure that the column of test fluid within the capillary is at equilibrium, with the inlet 22 closed, suction or pressure to may be applied to move the column away from equilibrium. This may be accomplished by manipulating the piston 16 of the reservoir 14, which is coupled to the capillary. The valve 18 allows for the adjustment of the level of fluid height within the capillary. The upper reservoir 14 is filled with a fluid that is non-miscible with the test fluid and non-wetting to the glass surface. Air provides the most convenient non-miscible, non-wetting fluid for use with the testing apparatus, although other fluids may also be used. When a gas is used as the non-wetting fluid, the ideal gas law, and any refinements thereof, may be used to approximate the change in pressure resulting from a change in volume caused by displacement of the piston. In an actual formation, the position of the impermeable barrier is fixed, however, and only the level of water in the capillary changes, i.e. the position of the transition zone changes.

After the column of test fluid has been moved away from equilibrium, it is allowed to re-achieve equilibrium. The height of the column of the test fluid in the capillary above the fluid level in the container is then measured. This procedure may be repeated several times to ensure consistent results. Means to enhance the accuracy of the measurement, such as a cathetometer, can be employed.

Once the baseline has been established, the surfactant to be tested is added to treat the surfaces of the capillary. This may be done by adding the surfactant directly to the water already in the container and then mixing it thoroughly. Alternatively, the surfactant may be injected into the capillary itself.

Another test with the surfactant or wettability altering material, which shall be hereinafter referred to as the "Capillary Pressure Test," is then conducted, as previously described for the deionized water, to provide a baseline for the surfactant being evaluated. A suitable surfactant will result in a drop in capillary pressure for the surfactant, which is determined by a decrease in the measured height of the interface at equilibrium.

Suitable surfactants may be selected based upon several selection criteria. Surfactants may be initially selected from those that lower the capillary pressure in the Capillary Pressure Test. Those surfactants that meet this initial criteria may then be tested to see if they show good persistence by exhibiting a reduced capillary pressure after flushing with three (3) pore volumes of brine. Further criteria for selection of surfactants may include surfactants that have a solubility of from about 5 to 50 times the critical micelle concentration (CMC), surfactants that show capillary pressure lowering at low effective concentrations, those that are environmentally friendly and those that have good physical properties to facilitate the handling and application.

Wettability can also be measured using formation rock, but the technique is very tedious and requires careful attention to detail. Reference: Donaldson, E. C., Thomas, R. D. and P. B Lorenz.: "Wettability Determination and its Effect on Recovery Efficiency," SPEJ (March 1969)13-20. Reference: Amott, Earl: "Observations Relating to the Wettability of Porous Rock", Trans. AIME-(1959) Vol. 216,156-162.

In an actual reservoir, which is typically a reservoir system with low vertical permeability, the position of the upper impermeable barrier remains fixed. Only the level of water in the formation (or capillaries) changes, i.e. the position of the transition zone changes. It is apparent that the level of water in the capillary will change as the pressure in the reservoir, $P_r$, changes.

Figure 3:
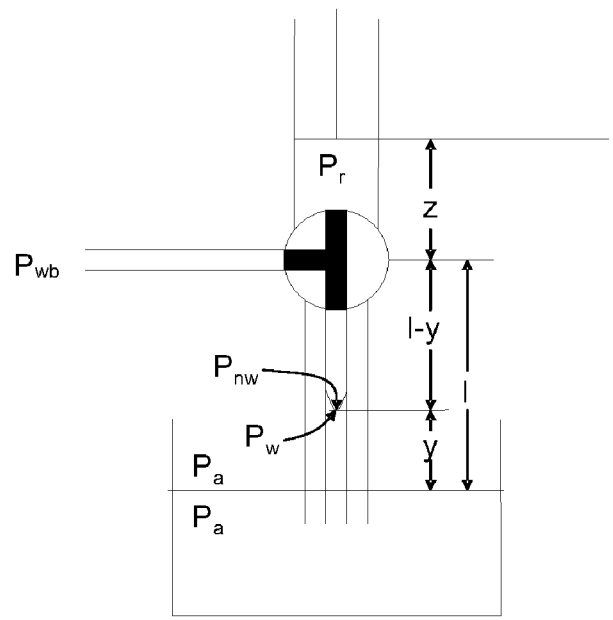
FIG. 3 is a schematic of the system of FIG. 2, illustrating different fluid pressures within the system; and, FIG. 4 is a schematic showing the system of FIG. 2 after a treatment surfactant has been introduced, illustrating the effect of reducing the capillary pressure.

The difference between the reservoir pressure ($P_r$) and the flowing bottomhole pressure ($P_{wb}$) is referred to as "drawdown." This is the driving force that forces water from the aquifer into the wellbore. As used herein, "$P_a$" refers to the pressure in the reservoir at the aquifer-air contact a sufficient distance away from the cone of water so as not to be influenced by the cone. To demonstrate how capillary pressure reduces drawdown required for water influx reference is made to FIG. 3, which shows different fluid pressures in the testing apparatus. FIG. 3 shows a simple diagram that may be used to determine the drawdown required for water to be raised to the level of the lowest perforation, represented by inlet 22. The pressure at the lowest perforation is $P_{wb}$, i.e. the wellbore pressure at that depth. The following illustrates how a high capillary pressure, $P_c$, reduces the allowable drawdown, as illustrated by Equation (3) below:

$$P_a - P_{wb} + P_c > \rho_w g l \quad (3)$$

where,
 $P_a$=the aquifer pressure;
 $P_{wb}$=the wellbore pressure;
 $P_c$=the capillary pressure;
 $\rho_w$=density of the wetting fluid;
 g=gravity (9.8 m/s² or 32.17 ft/s²); and
 l=distance from the oil-water contact in the absence of coning to the lowest perforation.

In order for water to be raised to the level of the lowest perforation, the following applies:

$$P_{nw} - P_{wb} > \rho_w g(1-y) \quad (4)$$

where,
 $P_{nw}$=the pressure of the non-wetting fluid;
 $\rho_w$=the density of the wetting fluid; and
 y=the capillary height of the wetting fluid.

From Equation (1) above it follows that:

$$P_c + P_w - P_{wb} > \rho_w g(1-y) \quad (5)$$

It also follows that:

$$P_w = P_a - \rho_w g y \quad (6)$$

so that:

$$i\ P_c + P_a - \rho_w g y - P_{wb} > \rho_w g(1-y) \quad (7)$$

From the above, it can be seen that reducing, eliminating or even making the capillary pressure negative will allow greater drawdown.

Figure 4:
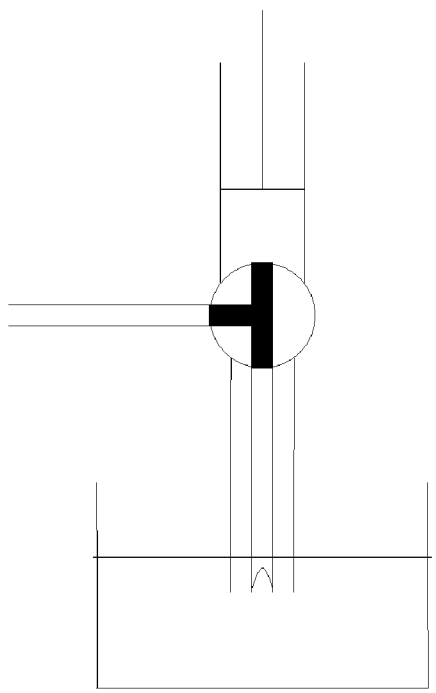

FIG. 4 depicts what may be expected following treatment of a reservoir to alter the relative permeability of an area near the well bore. After treating with a suitable surfactant solution, the surfactant will alter the mineral surface in the zone of contact to change the contact angle of the wetting fluid, as is shown. In this case, the formation has been altered by the surfactant to be strongly oil wet. The actual alteration could also be neutral-wet to oil-wet. By changing the wettability or contact angle the capillary pressure is also reduced, or, in this case, is actually negative. As seen from the equations presented above, this immediately allows a higher drawdown. Before water can be produced, the drawdown pressure must exceed the hydrostatic pressure plus the capillary pressure or:

$$P_a - P_{wb} > \rho_w g l + P_c \quad (8)$$

As previously discussed, the above Capillary Pressure Test may be used in selecting appropriate surfactants or materials for use in altering the wettability of the formation surfaces to reduce the capillary pressure. The materials should be readily soluble or dispersible in water or other aqueous carrier fluid. A number of materials such as asphaltenes and resins will change the surface wettability to oil-wet state. However, these materials are not water soluble and cannot be transported through the water cone easily. Optionally, the surfactant may be selected to be environmentally friendly and have a suitable pour point at temperatures that may be encountered during use, e.g. a pour point of around −10° F. (−23.3° C.) or lower. In addition, the selected material should have a flash point above 100° F. (37.8° C.) and preferably above 140° F. (60° C.) for safe handling.

Cationic, anionic, non-ionic or zwitterionic surfactants or combinations of these may be used, provided they alter the capillary pressure as described previously. The most efficacious treatment might be different from well to well, even in the same reservoir, as the diagenetic history might be different. The optimal treatment may be formulated to meet specific objectives or well conditions.

Not to be limited by any particular surfactant, particularly well suited for use as the treating surfactant for oil formations are those having the alkyl-group-containing amine oxide surfactants of the formula $R^1$-$R^2$-$R^3$ amine oxide, wherein $R^1$ is an alkyl group containing from 6 to 16 carbon atoms, more particularly from 8 to 14 carbon atoms, and may be linear, branched, saturated or unsaturated, and $R^2$ and $R^3$ methyl or ethyl groups.

Specific non-limiting examples of suitable surfactants include octyl-dimethyl amine oxide, nonyl-dimethyl amine oxide, decyl-dimethyl amine oxide, undecyl-dimethyl amine oxide, dodecyl-dimethyl amine oxide, tetradecyl-dimethyl amine oxide, hexadecyl-dimethyl amine oxide, coco-dimethyl amine oxide, lauryl-dimethyl amine oxide, cetyl-dimethyl amine oxide, palmitic-dimethyl amine oxide, stearic-dimethyl amine oxide, mysristic-dimethyl amine oxide, palmitoleic-dimethyl amine oxide, linoleic-dimathyl amine oxide, and linolenic-dimethyl amine oxide.

As an example, both laboratory testing and field results have shown that decyl dimethyl amine oxide surfactant can provide wetting properties that lead to lower capillary pressures. The contact angle resulting from the use of decyl dimethyl amine oxide surfactant has been shown to be higher than those for other conventional surfactants including ethoxylated linear alcohols with 10 to 12 carbon chain lengths, ethoxylated sulfate alcohols with 6 to 10 carbon chain lengths, fatty acid alcohol ether sulfates and betaines. Decyl dimethyl amine oxide surfactant has been shown to impact both sandstone and limestone formations.

The treating surfactant is added to a carrier fluid. The carrier fluid may be an aqueous fluid or non-aqueous fluid. The aqueous carrier fluid may be fresh water, salt water or a brine. Non-aqueous carrier fluids may include crude oil, mineral oil, diesel, polymerized glycols and mutual solvents such as ethyleneglycol monobutylether. The surfactant may be added to the carrier fluid in a batch operation or pumped into the treating line on the fly in an amount sufficient to accomplish the required alteration of the rock wettability; that amount being from about 2 or more times the critical micelle concentration (CMC) of the surfactant for the carrier fluid. In certain instances the surfactant may be added in an amount of from about 5 to about 50 times the CMC of the surfactant for the carrier fluid. The surfactant may be at a concentration that is less than the solubility limit within the carrier fluid at the temperature the treatment fluid is designed for use. The surfactant is preferably dissolved in the carrier fluid and applied at a concentration less than the solubility limit at the temperature of application but greater than the CMC. However dispersions of the surfactant in the carrier fluid may also be effective.

It should be noted that description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

The surfactant may be used to reduce or eliminate three-dimensional coning, cusping or channeling through unfractured matrix with crossflow. In water wells that are subject to coning of air, the treatment should be useful in maintaining high water production rates.

After injection of the treatment fluid, the well may be shut in to allow oil or natural gas to displace the treating fluid into the aquifer and/or transition zone. Any suitable shut-in time may be used. In some embodiments, shut-in times may vary from about 12 hours, about 24 hours, about 48 hours, to about 1 week, about 2 weeks, or more.

Optionally, a suitable overflush fluid, which may be aqueous or non-aqueous, such as a hydrocarbon, such as oil (e.g. crude oil, mineral oil, etc.), alcohols such as methanol or ethanol or gas, depending upon the fluid produced, may be injected subsequently to the surfactant treatment fluid. The overflush fluid may contain substantially no oil-wetting or water-repelling surfactant. The overflush fluid may be a fluid in which the surfactant is soluble. The overflush fluid may be selected from those that will not substantially alter the wettability from neutral wetting to strongly oil wetting. The overflush fluid may also be one in which the surfactant is readily dispersible. Preferably the overflush fluid should have properties that will result in an efficient displacement of the treating fluid.

A preflush is optionally used to condition the reservoir rock for optimal absorption of the surfactant. Mutual solvents have the ability to remove deposits from the rock surface. Oxidizers, specific acids and acidic gases may be of benefit in conditioning the rock. Also, clay stabilizers may be employed in the preflush to prevent fines migration and swelling of water sensitive clays.

In a prophylactic treatment, the aquifer is penetrated. Perforations may be formed in the wellbore in the aquifer. This too may be followed by the injection of an overflush fluid to further displace the water of the water-bearing zone, as previously described. Any perforations of the wellbore in the water-bearing zone are isolated and then the wellbore may be perforated in the hydrocarbon zone to bring the well on production.

Subsequent to the injection of the surfactant treatment fluid, if a hydrocarbon treatment follows, a further blocking agent may be introduced into the formation. Blocking agents may be those that are typically used in the mitigation of water production, and which are known to those skilled in the art. The blocking agents may be those gels or hydratable polymers that are crosslinked in situ or can include a polymer with relative permeability modifying (RPM) properties. Such blocking agents include hydratable polymers including polyacrylamides and modified polyacrylamides containing various monomers such as acrylic acid, methacrylic acid, vinyl pyrrolidone or sodium AMPS that are used alone as RPM or crosslinked in situ to form strong blocking gels, natural polymers such as xanthan gum, guar gum, derivatized guar gums, water soluble cellulose such as hydroxyethyl cellulose or carboxymethyl cellulose and the like. Typical crosslinkers include metallic crosslinkers such as chromium, zirconium, aluminum or cobalt, organic crosslinkers such as aldehydes, polyethyleneimines, phenolic-aldehydes, difunctional aldehydes such as glyoxal and glutaraldehyde. Other blocking agents include inorganic materials such as sodium silicate gels, aluminum gels, plastics including phenolplasts and epoxies, gels prepared from lignosulfonates, precipitation agents such as calcium silicates, hardenable resins and polyurethanes.

The above-described treatments may be conducted periodically. Thus, for example, the various treatments may be carried out at intervals of one month, two months, three months, six months, one year, two years, etc. This may be done on a predetermined schedule or in response to the concentration of surfactant that is found in the produced fluids. In such instances, the minimum effective surfactant concentration may be determined and monitored. When the surfactant concentration, as determined from the produced fluids, falls below an effective level, a subsequent treatment may be carried out.

If removal of the surfactant is necessary, the placed surfactant may be allowed to naturally desorb from surfaces over time. If more immediate removal is necessary, compounds that will interact with the surfactant may be introduced into the formation. These may include other surfactants, solvents, salt solutions, acids or bases, etc. that alter the association of the surfactant with the formation.

The surfactant treatment is very simple to carry out and may be injected into the well without the need for selective placement. This avoids the higher cost and logistical complexities associated with other interventional techniques.

The treatment may cause only a minimal reduction in rate from the productive interval. In contrast to conventional blocking materials, the surfactant treatment lends itself to removal or re-treatment.

The surfactant treatment can be applied in formations with fissures or fractures. The capillary pressure between two fracture faces can be quite large, especially if the fracture width is small. Such fractured formations thus may lend themselves to treatment by the surfactant fluid.

In some applications, an aquifer supplying water to the surface via an artesian well, natural spring or pumped well exists. In some situations, the aquifer is in communication with air above. In those instances, air can cone downward into the aquifer and limit the amount of water being produced. In these instances, alteration of the capillary pressure can beneficially reduce or eliminate the coning tendency. The concepts described above apply; however, the preferred surfactant is one which increases or maintains the capillary pressure, water wets the formation, or both. In these cases, the method of testing wettability alteration is still applicable and can be combined with a method for measuring the surface tension.

The desirable fluid is water and the undesirable fluid is air or possibly a vapor which has entered the groundwater from a polluted site or spill. Remedial treatments to reduce existing coning would include application of a treating fluid to the air or vapor zone and producing the water. Preflushes and overflushes may be beneficial in obtaining some treatments. Monitoring of the surfactant levels at the surface can be done to determine the timing for a re-treatment.

Prophylactic treatments can be performed by first producing the air zone to cone water upward, treating with surfactant in either or both the air zone and the water zone, followed by production from the water zone. Alternatively, the treatment fluid can be injected into the water zone prior to producing the well.

The following examples serve to further illustrate the invention.

EXAMPLES

Example 1

Various surfactants were tested using an apparatus such as that shown in FIG. 1. The capillary tubes were 0.8 mm in diameter. The container and capillary tubes were each soaked in a hot nitric acid solution for 5 minutes, rinsed with deionized water and dried. Deionized water was added to the reservoir to form a baseline. The capillary tube was lowered into the reservoir, ensuring that no air was trapped in the tube while venting air through tube 22. The rise of the fluid above the reservoir was measured with a ruler. The valve was turned by 180° and the equilibrium disturbed by injecting or removing some air with the piston. The capillary rise height was then reconfirmed. This procedure was repeated four times and a total of five readings were averaged and reported. The surfactant solution to be tested was added to the solution reservoir at the desired concentration and stirred to obtain a uniform concentration. The above procedure was repeated and the average of three readings was recorded. Next, three pore volumes of deionized water were flushed through the capillary to determine the persistence of the surfactant's ability to alter wettability. The capillary rise height was again measured. The capillary apparatus was then rinsed and cleaned with the nitric acid solution prior to measurements with a new surfactant solution. Another experiment was performed with two promising surfactants where the tube was shutin over the weekend and the capillary heights measured again three days later. The results are presented in Table 1 below.

TABLE 1

| Capillary Sample | Surfactant Dissolved in DI Water | Product Conc., vol % | Initial Capillary Rise, cm | % Change vs. DI Water | Final Capillary Rise, cm* | % Change vs. DI Water |
|---|---|---|---|---|---|---|
| 1 | DI water | 0 | 3.56 | 100 | 3.56 | 100 |
| 2 | Lauryl-dimethyl amine oxide | 0.5 | 0.940 | −74 | 2.39 | −33 |
| 3 | Cetyl-dimethyl amine oxide | 0.5 | 1.04 | −71 | 2.31 | −35 |
| 4 | Mixture of coco trimethyl ammonium chloride and bis (2-hydroxyethyl) cocoamine oxide | | 1.09 | −69 | 2.54 | −29 |
| 5 | Decyl-dimethyl amine oxide | 5 | 1.30 | −64 | 1.40 | −61 |
| 6 | Amphoteric alkyl amine | 1 | 1.55 | −56 | 2.44 | −32 |
| 7 | Mixture of Dicoco Dimethyl Ammonium Chloride and Di-Secondary Butyl Phenol w/10 Moles Ethylene Oxide | 1 | 1.35 | −62 | 1.35 | −62 |

*After 3 pore volumes of flush with DI water. One pore volume is the volume held by the capillary.

Example 2

Samples 1, 5 and 7 from Example 1 were further aged for approximately 72 hours and retested. The results are presented in Table 2 below.

TABLE 2

| Capillary Sample | Surfactant Dissolved in DI Water | Product Conc., vol % | Initial Capillary Rise, cm | % Change vs. DI Water | Final Capillary Rise, cm* | % Change vs. DI Water |
|---|---|---|---|---|---|---|
| 1 | DI water | 0 | 3.56 | 100 | 3.56 | 100 |
| 5 | Decyl-dimethyl amine oxide | 5 | 0.711 | −80 | 0.711 | −80 |
| 7 | Mixture of Dicoco Dimethyl Ammonium Chloride and Di-Secondary Butyl Phenol w/10 Moles Ethylene Oxide | 1 | 0.991 | −72 | 1.30 | −64 |

*After 3 pore volumes of flush with DI water. One pore volume is the volume held by the capillary.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of treating a subterranean formation penetrated by a wellbore to mitigate the production of air from the wellbore, the method comprising:
    producing the air from the zone predominantly containing the air so as to form a cone of water upward into the zone predominantly containing the air;
    forming a treatment fluid comprising a carrier fluid and at least one of a water-wetting surfactant or a surfactant which strongly reduces the surface tension;
    introducing the treatment fluid into the wellbore; and,
    subsequently producing from the zone predominantly containing the water.

2. The method of claim 1, wherein the treatment fluid is introduced into the zone predominantly containing the water prior to producing the air from the zone predominantly containing the air so as to form a cone from the zone predominantly containing the water into the zone predominantly containing the air.

3. The method of claim 1, wherein the treatment fluid is introduced into the zone predominantly containing the air prior to producing the air from the zone predominantly containing the air so as to form a cone from the zone predominantly containing the water into the zone predominantly containing the air.

4. The method of claim 1, wherein the carrier fluid comprises a non-aqueous fluid.

5. The method of claim 4, wherein the carrier fluid is selected from a gas, crude oil, mineral oil, non-aqueous fluids in which the water-wetting surfactant or a surfactant which strongly reduces the surface tension are soluble, non-aqueous fluids that do not substantially alter surface wettability from generally water wet and non-aqueous fluids in which the water-wetting surfactant or a surfactant which strongly reduces the surface tension are dispersible.

6. The method of claim 1, wherein an overflush of at least one of an aqueous fluid or non-aqueous fluid containing substantially no water-wetting surfactant or a surfactant which strongly reduces the surface tension is introduced into the formation following introduction of the treatment fluid.

7. The method of claim 1, further comprising introducing a blocking agent into the wellbore following introduction of the treating fluid.

8. The method of claim 1, wherein the carrier fluid is aqueous.

9. The method of claim 1, wherein the surfactant concentration is less than the solubility limit within the carrier fluid at the temperature of use.

10. The method of claim 1, wherein the surfactant provides a reduction in capillary pressure.

11. The method of claim 1, wherein the treatment fluid is an aqueous fluid and the surfactant is present in the treatment fluid in an efficacious amount; from about 1 or more times the critical micelle concentration (CMC) of the surfactant for the aqueous fluid.

12. The method of claim 1, wherein the surfactant is present in the treatment fluid in an amount of from about 5 to about 50 times above the critical micelle concentration (CMC) of the surfactant for the aqueous fluid.

13. The method of claim 1, wherein the well is shut in for a period sufficient to accomplish the required alteration of the formation treated; normally at least 24 hours subsequent to introduction of the treatment fluid into the wellbore.

14. The method of claim 1, further comprising introducing an acidizing fluid into the formation through the wellbore and removing at least a portion of the acidizing treatment fluid through the wellbore after a preselected period of time prior to introducing the treatment fluid into the wellbore.

15. The method of claim 1, wherein the treatment fluid is introduced into the wellbore as a prepad prior to introduction of pad fluid in a hydraulic fracturing treatment.

16. The method of claim 1, further comprising subsequent to introduction of the treatment fluid, monitoring fluids produced from the wellbore for surfactant content and retreating the well with a second treatment fluid when the surfactant content of the produced fluids reaches a preselected level.

* * * * *